United States Patent
Simell et al.

(10) Patent No.: US 8,100,995 B2
(45) Date of Patent: Jan. 24, 2012

(54) MULTIPLE STAGE METHOD OF REFORMING A GAS CONTAINING TARRY IMPURITIES EMPLOYING A ZIRCONIUM-BASED CATALYST

(75) Inventors: Pekka Simell, Vantaa (FI); Esa Kurkela, Espoo (FI)

(73) Assignee: Teknologian Tutkimuskeskus VTT, Espoo (FI)

( * ) Notice: Subject to any disclaimer, the term of this patent is extended or adjusted under 35 U.S.C. 154(b) by 539 days.

(21) Appl. No.: 12/296,083

(22) PCT Filed: Apr. 10, 2007

(86) PCT No.: PCT/FI2007/000090
§ 371 (c)(1),
(2), (4) Date: Mar. 26, 2009

(87) PCT Pub. No.: WO2007/116121
PCT Pub. Date: Oct. 18, 2007

(65) Prior Publication Data
US 2009/0324471 A1    Dec. 31, 2009

(30) Foreign Application Priority Data
Apr. 10, 2006  (FI) ...................... 20060346

(51) Int. Cl.
*C01B 3/36* (2006.01)
*C10J 3/46* (2006.01)
(52) U.S. Cl. .................. 48/197 R; 48/198.1; 48/204
(58) Field of Classification Search ............ 48/197 R, 48/198.1, 204
See application file for complete search history.

(56) References Cited

U.S. PATENT DOCUMENTS

| | | | | |
|---|---|---|---|---|
| 3,759,678 A | * | 9/1973 | Chamberland et al. ...... | 48/214 A |
| 4,865,625 A | | 9/1989 | Mudge et al. | |
| 6,152,975 A | * | 11/2000 | Elliott et al. ................ | 48/197 R |
| 7,455,705 B2 | * | 11/2008 | Simell et al. ................ | 48/198.3 |

FOREIGN PATENT DOCUMENTS

| | | |
|---|---|---|
| EP | 1142981 A2 | 10/2001 |
| EP | 1770058 A1 | 4/2007 |
| FI | 110691 B | 12/2002 |
| JP | 58-134186 A | 8/1983 |
| JP | 2004217505 A | 8/2004 |

(Continued)

OTHER PUBLICATIONS

English abstract of JP 58-134186 published Aug. 10, 1983, 1 page.

(Continued)

*Primary Examiner* — Timothy Vanoy
(74) *Attorney, Agent, or Firm* — Rothwell, Figg, Ernst & Manbeck, P.C.

(57) ABSTRACT

The invention relates to a method of reforming a gas containing tarry impurities, such as the gasification gas obtained by gasifying a fuel. In the method, oxygen or an oxygenous gas (10) is added to a gas flow (8), after which the gas is brought into contact with a solid catalyst (11, 12) at a high temperature. According to the invention, the reformation takes place in stages so that, in the first pre-reforming stage, the gas is brought into contact with a zirconium-based catalyst (11), such as zirconium oxide, for example, and, in the next stage, with a metal catalyst (12), such as metallic nickel. The two-stage reformation is used for preventing the deactivation of the metal catalyst and the formation of carbon deposits in the reforming reactor. The invention also includes the use of the zirconium compound in pre-reforming the tar-bearing gas to achieve the said goals.

22 Claims, 1 Drawing Sheet

FOREIGN PATENT DOCUMENTS

Figure 1:
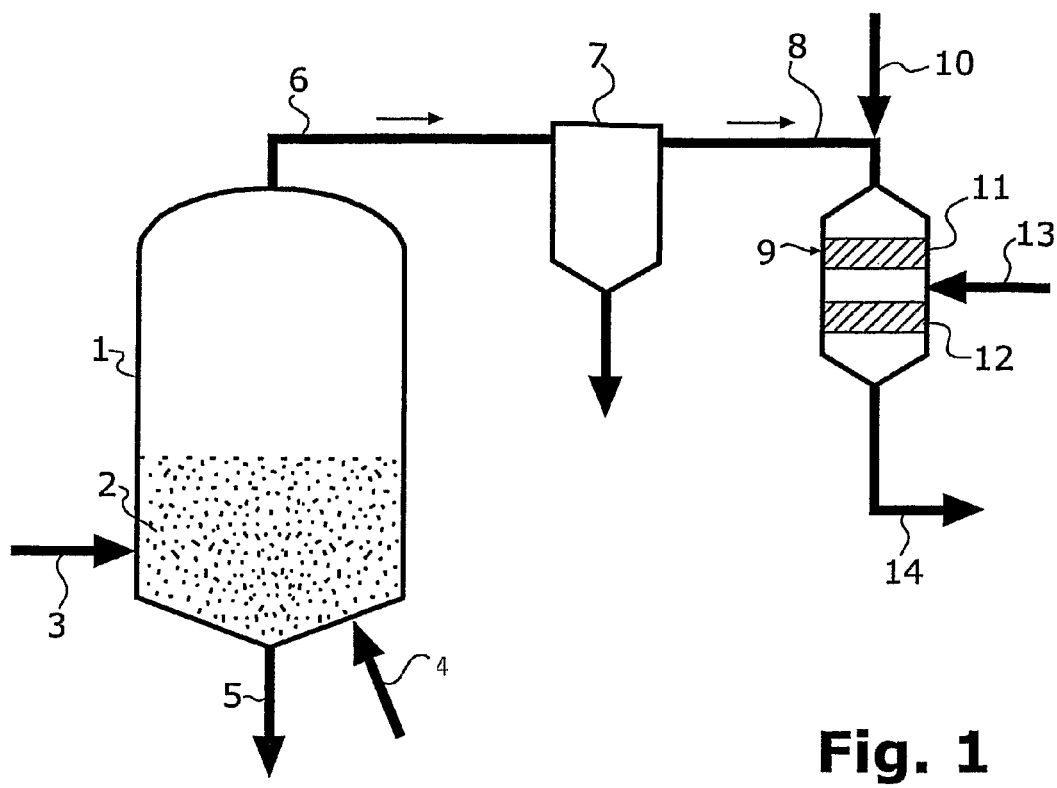

| | | |
|---|---|---|
| JP | 2004292720 A | 10/2004 |
| WO | 2003000829 A1 | 1/2003 |
| WO | 2006001438 A1 | 1/2006 |
| WO | 2006031011 A1 | 3/2006 |

OTHER PUBLICATIONS

Supplementary European Search Report issued in EP application No: 07730559.7 dated Sep. 7, 2011, 7 pages.

J. Hepola et al.: "Sulphur poisoning of nickel-based hot gas cleaning catalysts in synthetic gasification gas I. Effect of different process parameters," Applied Catalysis B: Environmental, vol. 14, Sep. 1996, pp. 287-303.

P. Simell et al.: "Catalytic purification of tarry fuel gas," Fuel, vol. 69, Oct. 1990, pp. 1219-1225.

* cited by examiner

MULTIPLE STAGE METHOD OF REFORMING A GAS CONTAINING TARRY IMPURITIES EMPLOYING A ZIRCONIUM-BASED CATALYST

CROSS REFERENCE TO RELATED APPLICATION(S)

This application is a 35 U.S.C. §371 National Phase Entry Application from PCT/FI2007/000090, filed Apr. 10, 2007, and designating the United States. This application also claims the benefit of Finland Application No. FI-20060346, filed Apr. 10, 2006, the disclosure of which is incorporated herein in its entirety by reference.

The invention relates to a method of reforming a gas containing tarry impurities, wherein a gas flow with oxygen or oxygen-containing gas added thereto is brought into contact with a solid catalyst. The invention also relates to the use of the catalyst in reforming the gas containing the said impurities.

A gas that is obtained by gasifying a fuel, the main components of the gas being carbon monoxide, carbon dioxide, methane, hydrogen, water vapour and nitrogen, typically, contains small amounts of tarry organic compounds as impurities. Furthermore, the gasification gas contains, as an impurity, ammonia formed from the nitrogen compounds in the fuel.

The tarry impurities contained in the gasification gas present a disadvantage when the gas is used, for example, for the production of electricity by means of an engine or a turbine, or for the production of a synthesis gas for a methanol synthesis, for example. When burning the gas, the ammonia, in turn, converts into environmentally hazardous nitrogen oxides. Consequently, there exists a need to purify the gasification gas of the hazardous components before it is burned or otherwise further processed.

An efficient method of purifying the gasification gas of both the tarry impurities and the ammonia is a reformation that takes place at a high temperature by means of catalysts. Known catalysts that are well-suited to decomposing the tar contained in the gasification gas include nickel catalysts and dolomites, the operating temperatures of which are 800-900° C. In such conditions, the nickel catalysts also decompose ammonia. The high reaction temperature required in the tests conducted with the nickel and dolomite catalysts is achieved by a partial combustion of the gasification gas.

Especially, when using the nickel catalysts, the required high temperature presents a problem and, partly, also the tendency caused by the same to form soot in the catalytic gas conditioning. The soot produces carbon deposits on the catalysts and in the reactor and may, finally, lead to a blockage of the entire reactor. The nickel and other metal catalysts also present problems in the start-up of the gasification process, whereby the temperature in the purification reactor is relatively low, below 700° C. In connection with the start-up, the operation of the gasifier may occasionally be unstable, and the tar content of the product gas may then rise extremely high, which may also cause an accumulation of carbon on the catalyst and accelerate the deactivation of the catalyst and the blockage of the reactor.

The above-mentioned problems are further emphasized in synthesis gas applications, in which also light hydrocarbons should be reformed. The metal catalyst must then be used at a higher temperature and, possibly, a higher metal content of the catalyst is needed. In this way, preventing the accumulation of carbon on the catalyst becomes even more difficult than in power plant applications.

Fl patent specification 110691 describes the catalytic purification of a gasification gas, wherein the catalyst used is a zirconium compound, such as zirconium oxide $ZrO_2$. Such a zirconium catalyst works efficiently in decomposing tars, especially heavier hydrocarbons. The zirconium catalyst enables the use of a considerably wider temperature range than the nickel catalyst, about 600-900° C. In the tests, the zirconium catalyst provided a tar conversion of 60-80% at a temperature of about 600° C.

The purpose of the invention is to provide a method of reforming a gas containing tarry impurities, producing a high conversion of tarry impurities without the disadvantages related to the present nickel or other metal catalysts. In particular, the purpose of the invention is to provide a solution that works at a temperature lower than the present nickel catalysts and wherein the problems of deactivating the catalyst and blocking the reactor related to the nickel catalyst are avoided. The method according to the invention is characterized in that the reformation takes place in stages so that, in the first stage, the gas is brought into contact with a zirconium-based catalyst and, in the next stage, with a metal catalyst.

Thus, the invention comprises conducting the gas flow that is to be reformed, such as the gasification gas obtained from the fuel, mixed with oxygen or an oxygenous gas, to the first pre-reforming stage, wherein a zirconium-based catalyst, such as zirconium oxide $ZrO_2$ or a similar zirconium compound is used, and thereafter, to the next reforming stage, wherein the catalyst is metallic nickel or a precious metal. When necessary, oxygen or oxygenous gas can be added to the gas flow also between the said successive reforming stages.

The zirconium-based catalyst can be constituted by zirconium oxide that is alloyed with another metal oxide, such as aluminium oxide $Al_2O_3$. The proportion of the zirconium oxide or the other zirconium compound of the alloy is thus preferably over 50%. The zirconium compound can be on the surface of an inert carrier or impregnated into the carrier. The zirconium compound of the first pre-reforming stage and the metal catalyst of the next reforming stage can both comprise the coating of the ceramic or metallic honeycomb that works as the carrier. The catalysts of both reforming stages can be located in the same reactor and arranged as successive layers or zones in the flow direction of the gas that is to be reformed. On the other hand, it is also possible that the zirconium catalyst of the pre-reforming stage and the metal catalyst of the succeeding reforming stage are placed in separate reactors, which are located sequentially in the flow direction of the gas.

In the method according to the invention, the partial oxidation of the gas and the heat production required by the process are mainly effected in the first pre-reforming stage. In this connection, also the heaviest tar compounds decompose into gases almost completely. Hardly any formation of carbon on the zirconium catalyst takes place, whereby there is neither a risk of the reactor blocking. The operating temperature of the reforming process is 500-900° C., and the temperature of the first pre-reforming stage, which is effected with the zirconium catalyst, can be lower than that of the next reforming stage that is effected with the metal catalyst. The temperature in the pre-reforming stage can preferably be 600-800° C. and, in the next reforming stage that uses the metal catalyst, 700-900° C. In these conditions, also the said latter reforming stage comprising the metal catalyst works more efficiently and at a temperature lower than the known reformation that uses the nickel catalyst only. Lowering the temperature level in the reformer enhances the efficiency of the whole gasification process and improves the operating efficiency of the electricity production. Avoiding the deactivation caused by contamination, in turn, lengthens the service life of the metal catalyst.

The invention also comprises the use of the zirconium compound as a catalyst in the first pre-reforming stage of reforming the gas containing tarry impurities, followed by a reformation with a metal catalyst. The zirconium compound is preferably zirconium oxide, and the metal catalyst can consist of metallic nickel or a precious metal, such as Pt, Pd, Rh or Ru, which have been added, for example, by impregnating them into the carrier of the catalyst or its coating. Especially the use of the zirconium compound prevents the deactivation of the nickel catalyst and the formation of carbon deposits in the reforming reactor.

Figure 2:
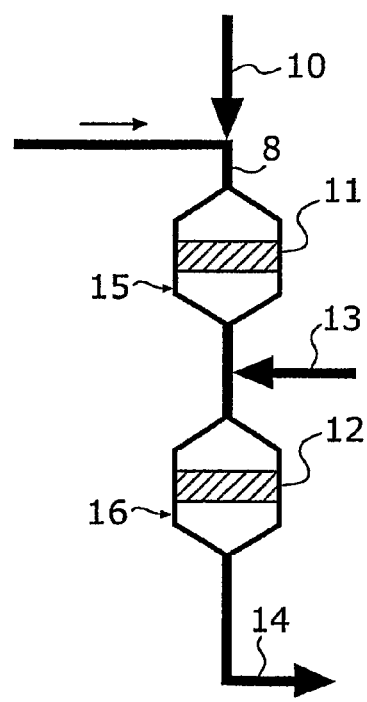

In the following, the invention is described in detail with reference to the appended drawing, in which FIG. 1 shows equipment for the gasification and the subsequent reformation of the gasification gas according to the invention, and FIG. 2 shows the reforming reactors included in the equipment according to another embodiment of the invention.

The equipment according to FIG. 1 comprises a fixed-bed gasifier 1, which is used for gasifying a fuel, such as wood chips or crushed wood 2. The feed of the fuel 2 in the figure is indicated by an arrow 3, the feed of air or a similar gasification gas by an arrow 4, and the ashes exiting the gasifier 1, by an arrow 5. The gasification gas, which forms in the gasifier 1 and mainly consists of carbon monoxide, carbon dioxide, methane, hydrogen, water vapour and nitrogen and also contains organic tarry compounds and ammonia as impurities, exits to a dust removal cyclone 7 through a pipe 6, and from there to a reforming reactor 9 through a pipe 8. For the reformation, oxygen or oxygenous gas, such as air, is fed into the pipe 8, which in the figure is indicated by an arrow 10. The space velocity of the gas under treatment in the reactor can be 500-10 000 l/h, preferably 1000-5000 l/h. The amount of air or other added gas 10 can be 0-20% of the amount of gasification gas coming from the gasifier 1.

In the reforming reactor 9, the catalytic reformation of the gas takes place at a temperature of preferably about 600-800° C. The reactor 9 contains two successive reforming zones 11, 12 in the flow direction of the gas, of which the first, the pre-reforming reactor 11 uses a zirconium-based catalyst, such as zirconium oxide, and the next reforming zone 12 uses a metal catalyst, such as metallic nickel or nickel oxide. The catalyst in both zones 11, 12 can comprise the coating of a ceramic honeycomb. Alternatively, the catalyst in these zones can be impregnated into a fixed carrier bed. Between the reforming zones 11, 12, oxygen or oxygenous gas is added to the reactor, being indicated by an arrow 13 in the figure. In the pre-reforming zone 11 that uses the zirconium catalyst, partial combustion of the gas takes place, generating the reaction heat required by the reformation. As a result of the combustion, the temperature of the gas in the reactor 9 rises, for example, so that the temperature in the pre-reforming zone 11 is about 600-700° C. and in the next zone 12 that uses the nickel catalyst, about 700-800° C. The reformed gas that is mainly purified of the tarry impurities and ammonia exits the reactor 9 into a pipe 14.

The embodiment of the invention according to FIG. 2 differs from that presented in FIG. 1 only in that the successive reforming stages are arranged so as to take place in separate reactors 15, 16, which follow each other in the flow direction of the gas. The first reactor 15 contains the zirconium catalyst 11, which is used for pre-reforming the gas, and the next reactor 16 contains the nickel catalyst 12, which is used for effecting the second reforming stage.

The functionality of the invention was tested according to the following embodiment examples.

EXAMPLE 1

The functioning of the invention was tested by a test reactor, the product gas of the fixed-bed gasifier being used as its feed. The fuel of the gasifier comprised crushed demolition wood. The volume flow rate of the gas was about 1.5 m$^3$/h and it was lead into a phased reformer, the first layer of the reformer comprising a zirconium oxide catalyst and its second layer comprising a precious metal catalyst. The catalysts were ceramic honeycombs, to which a coating containing zirconium oxide and a precious metal had been added. The temperature of the gas before the reformer was about 600° C. and air in an amount of 5-20% was mixed with it. The composition of the gas in the feed was $H_2$ 6-8% by volume, CO 10-12% by volume, $CO_2$ 9-11% by volume, $CH_4$ 1.5-2% by volume, $C_2H_4$ 1.5-2% by volume, $H_2O$ 18-28% by volume, and $N_2$ (the rest). The tar content of the gas in the feed was 6 g/m$^3$n and, in the output, 0.3-1.3 g/m$^3$n; hence, the tar conversion was 70-90%. The operating temperature of the zirconium zone was 600-700° C. and that of the precious metal catalyst zone 700-800° C. During the test, no increase in the pressure loss indicating an accumulation of carbon in the reformer was observed. The examination of the catalysts after the test also indicated that no carbon had accumulated on the catalysts.

EXAMPLE 2

For the sake of comparison, laboratory tests were conducted, examining the accumulation of carbon in a honeycomb that was coated with a nickel-based catalyst. The honeycomb catalyst had been placed in a reactor, whose feed comprised a gas mixture with a composition corresponding to the gasification gas (a gas mixture comprising the main components of the gas $H_2$, CO, $CO_2$, $CH_4$, $C_2H_4$, $H_2O$, and $H_2S$ 100 ppm and a tar model toluene/naphthalene mixture 15 g/m$^3$n). The temperature of the reactor was varied between 700-900° C. and the gas flow between 2-3 dm$^3$/min, the pressure of the reactor was 1 bar. The conversion of the tar model on the nickel catalyst was almost 100% at a temperature of 900° C. During several repeated tests, it was observed that carbon easily accumulated on the surface of the nickel catalyst and could even have clogged the honeycomb.

The invention claimed is:

1. A method of reforming a gas containing carbon monoxide, carbon dioxide, methane, hydrogen, water vapour and nitrogen, as well as tarry impurities, wherein a gas flow (8), to which oxygen or an oxygenous gas (10) has been added, is brought into contact with a solid catalyst (11, 12), characterized in that the reformation takes place in stages so that, in a first stage, the gas is brought into contact with a zirconium-based catalyst (11) and, in a next stage, with a metal catalyst (12), containing metallic nickel or a precious metal.

2. A method according to claim 1, characterized in that the gas that is to be reformed is a gasification gas containing tarry impurities.

3. A method according to claim 1, characterized in that the zirconium-based catalyst (11) contains a zirconium compound.

4. A method according to claim 3, characterized in that the zirconium-based catalyst (11) is constituted by zirconium oxide, which is alloyed with another metal oxide.

5. A method according to claim 1, characterized in that the zirconium compound is on the surface of an inert carrier or impregnated into the carrier.

6. A method according to claim 1, characterized in that the zirconium-based catalyst and the metal catalyst are arranged in successive layers or zones (11, 12) in the flow direction of the gas that is to be reformed.

7. A method according to claim 6, characterized in that the zirconium-based catalyst and the metal catalyst (11, 12) are placed in separate reactors (15, 16) in the flow direction of the gas.

8. A method according to claim 1, characterized in that, before the catalytic reformation, oxygen, air, or a mixture (10) of oxygen and air is added to the gas flow (8), which is to be reformed.

9. A method according to claim 1, characterized in that oxygen or an oxygenous gas, is also added to the gas flow after the pre-reformation that takes place on the zirconium-based catalyst (11) before the reformation on the metal catalyst (12).

10. A method according to claim 1, characterized in that the reforming temperature is 500-900° C.

11. A method according to claim 1, characterized in that the pre-reformation on the zirconium-based catalyst (11) takes place at a lower temperature, and the reformation on the metal catalyst (12) at a higher temperature.

12. The use of a zirconium compound as a catalyst in the first pre-reforming stage of reforming a gas containing carbon monoxide, carbon dioxide, methane, hydrogen, water vapour and nitrogen, as well as tarry impurities, followed by a reformation on a metal catalyst, containing metallic nickel or a precious metal.

13. The use according to claim 12, wherein the zirconium compound is zirconium oxide.

14. The use of the zirconium compound according to claim 12 to prevent formation of carbon deposits in the reforming reactor.

15. The use of the zirconium compound according to claim 12 to prevent deactivation of the nickel or the precious metal catalyst.

16. The use of the zirconium compound according to claim 13, to prevent formation of carbon deposits in the reforming reactor.

17. The use of zirconium compound according to claim 13, to prevent deactivation of the nickel or the precious metal catalyst.

18. The method of claim 3 wherein said zirconium compound is zirconium oxide ($ZrO_2$).

19. The method of claim 4 wherein said metal oxide is aluminium oxide ($Al_2O_3$).

20. The method of claim 9 wherein said gas is air.

21. The method of claim 11 wherein said lower temperature is within a temperature range of 600-800° C.

22. The method of claim 11 wherein said higher temperature is within a temperature range of 700-900° C.

* * * * *